(12) United States Patent
Takahashi

(10) Patent No.: US 10,527,768 B2
(45) Date of Patent: Jan. 7, 2020

(54) INORGANIC POLARIZING PLATE AND METHOD FOR MANUFACTURING SAME

(71) Applicant: Dexerials Corporation, Shinagawa-ku, Tokyo (JP)

(72) Inventor: Eiji Takahashi, Tokyo (JP)

(73) Assignee: Dexerials Corporation, Tokyo (JP)

(*) Notice: Subject to any disclaimer, the term of this patent is extended or adjusted under 35 U.S.C. 154(b) by 0 days.

(21) Appl. No.: 15/760,486

(22) PCT Filed: Oct. 4, 2016

(86) PCT No.: PCT/JP2016/079477
§ 371 (c)(1),
(2) Date: Mar. 15, 2018

(87) PCT Pub. No.: WO2017/073266
PCT Pub. Date: May 4, 2017

(65) Prior Publication Data
US 2018/0252854 A1 Sep. 6, 2018

(30) Foreign Application Priority Data

Oct. 29, 2015 (JP) ................. 2015-213344

(51) Int. Cl.
*G02B 27/28* (2006.01)
*G02B 5/30* (2006.01)

(52) U.S. Cl.
CPC ................. *G02B 5/3041* (2013.01)

(58) Field of Classification Search
CPC ...... G02B 5/3058; G02B 5/3041; G02B 1/08; G02B 27/28; G02B 5/1809; G02B 5/3008;
(Continued)

(56) References Cited

U.S. PATENT DOCUMENTS 6,122,103 A * 9/2000 Perkins ............... G02B 5/3058
359/485.03
6,765,721 B2 * 7/2004 Kawazu ............... G02B 5/3033
156/249
(Continued)

FOREIGN PATENT DOCUMENTS

EP 0999459 5/2000
JP 2000-147253 5/2000
(Continued)

OTHER PUBLICATIONS

Baba, K., et al., "Anisotropic optical media from laminated island films: theory", J. Opt. Soc. Am. A, pp. 619-624, vol. 8, No. 4, Apr. 1991.
(Continued)

*Primary Examiner* — William R Alexander
*Assistant Examiner* — Balram T Parbadia
(74) *Attorney, Agent, or Firm* — Carmody Torrance Sandak & Hennessey LLP

(57) ABSTRACT

An inorganic polarizing plate, including in the order of reciting: a substrate that is transparent to light in a range used; a plurality of linear metal layers; a plurality of linear dielectric layers; and a plurality of linear light absorbing layers having a light absorbing effect. The plurality of linear metal layers are arranged on the substrate in a state of being apart from each other at intervals shorter than a wavelength of the light, and the plurality of linear dielectric layers are arranged on the plurality of linear metal layers respectively. The plurality of linear light absorbing layers are arranged on the plurality of linear dielectric layers respectively, and the linear metal layers have hollow portions.

13 Claims, 10 Drawing Sheets

(58) Field of Classification Search
CPC .......... G02B 5/3025; G02B 6/005; G02F 2001/133548; G02F 1/133528; G02F 1/0136; G03B 21/006
See application file for complete search history.

(56) References Cited

U.S. PATENT DOCUMENTS

| | | | |
|---|---|---|---|
| 6,772,608 B1 | 8/2004 | Drost et al. | |
| 6,813,077 B2 * | 11/2004 | Borrelli | G02B 6/2746 216/24 |
| 6,912,087 B1 * | 6/2005 | Borrelli | C03B 23/037 359/485.03 |
| 7,113,335 B2 * | 9/2006 | Sales | G02B 5/3058 359/485.03 |
| 7,233,563 B2 * | 6/2007 | Ueki | G02B 5/3058 369/112.03 |
| 2008/0186576 A1 | 8/2008 | Takada | |
| 2010/0065837 A1 * | 3/2010 | Omura | H01L 29/7869 257/43 |
| 2012/0105745 A1 | 5/2012 | Kumai | |
| 2012/0168889 A1 | 7/2012 | Ooka | |
| 2015/0109587 A1 * | 4/2015 | Natsumeda | G03B 21/2006 353/84 |
| 2015/0226896 A1 | 8/2015 | Hirata et al. | |
| 2015/0293560 A1 * | 10/2015 | Choi | G06F 3/0412 345/174 |
| 2016/0131810 A1 | 5/2016 | Takada et al. | |

FOREIGN PATENT DOCUMENTS

| | | |
|---|---|---|
| JP | 2002-372620 | 12/2002 |
| JP | 2008-216956 | 9/2008 |
| JP | 2008-216957 | 9/2008 |
| JP | 2012-048258 | 3/2012 |
| JP | 2012-098469 | 5/2012 |
| JP | 2012-142501 | 7/2012 |
| JP | 2015-034985 | 2/2015 |
| JP | 2015-125252 | 7/2015 |
| WO | 2013/190680 | 12/2013 |

OTHER PUBLICATIONS

Shiraishi, K., et al., "Microisolator", Applied Optics, pp. 311-314, vol. 25, No. 2, Jan. 15, 1986.

Shiraishi, K., et al., "Laminated Polarizers Exhibiting High Performance Over a Wide Range of Wavelength", Journal of Lightwave Technology, pp. 1042-1050, vol. 15, No. 6, Jun. 1997.

* cited by examiner

INORGANIC POLARIZING PLATE AND METHOD FOR MANUFACTURING SAME

TECHNICAL FIELD

The present invention relates to an inorganic polarizing plate and a method for producing the same.

BACKGROUND ART

Due to their image forming principles, liquid crystal display devices are required to have polarizing plates on the surface of the liquid crystal panels. The function of the polarizing plate is to absorb one of polarized light components orthogonal to each other (so-called P-polarized light wave and S-polarized light wave) and let the other of the polarized light components pass through the polarizing plate.

Hitherto, dichroic polarizing plates obtained by adding iodine-based or dye-based polymeric organic substances in films have often been used as such polarizing plates. As a common method for producing such polarizing plates, a method of staining a polyvinyl alcohol-based film with a dichroic material such as iodine, then allowing the film to undergo cross-linking using a cross-linking agent, and uniaxially stretching the film is used. Because dichroic polarizing plates are produced by stretching as described above, there is a general tendency that the dichroic polarizing plates easily shrink. Furthermore, because polyvinyl alcohol-based films use hydrophilic polymers, the polyvinyl alcohol-based films are highly likely to deform, particularly under humidified conditions. Moreover, because films are used in the first place, mechanical strength as devices is poor. In order to avoid this, a method of bonding a transparent protective film is employed.

In recent years, liquid crystal display devices have come to have a broadened range of applications and have become highly functionalized. Along with this, individual devices constituting the liquid crystal display devices are required to have a high reliability and durability. For example, in the case of liquid crystal display devices such as transmissive liquid crystal projectors that use light sources having a high light quantity, polarizing plates receive strong radiating rays. Therefore, the polarizing plates used in these devices are required to have an excellent heat resistance. However, because such film-based polarizing plates as described above are organic matters, there is naturally a limitation to increasing this property.

In the United States, an inorganic polarizing plate having a high heat resistance is available from Corning Incorporated under a product name POLARCOR. This polarizing plate has a structure of silver particles being dispersed in glass, and does not use an organic substance such as a film. Its principle is to utilize plasma resonance of island-like particles. That is, this principle is to utilize light absorption by surface plasma resonance that occurs when light becomes incident to island-like particles of a noble metal or a transition metal, and the absorption wavelength is affected by the shape of the particles and a surrounding dielectric constant. Here, when the shape of the island-like particles is elliptic, different resonance wavelengths are obtained in the longer-axis direction and the shorter-axis direction. This provides a polarizing property. Specifically, a polarizing property of a polarized light component parallel with the longer axis being absorbed along the longer wavelength side and a polarized light component parallel with the shorter axis being let to pass is provided. However, POLARCOR provides the polarizing property for a wavelength range close to the infrared range, but does not cover the visible light range required in liquid crystal display devices. This is due to the physical properties of silver used as the island-like particles.

PTL 1 describes an UV polarizing plate that is obtained by applying the principle described above and depositing particles in glass by thermal reduction, and presents a specific example in which silver is used as metal particles. In this case, it is considered that absorption along the shorter-axis direction is utilized conversely to POLARCOR described above. As illustrated in FIG. 1, although the function as the polarizing plate is effective even near 400 nm, the extinction ratio is low and the absorbable range is very narrow. Therefore, even if POLARCOR and the technique of PTL 1 are combined, a polarizing plate that can cover the whole visible light range cannot be obtained.

NPL 1 describes a theoretical analysis of an inorganic polarizing plate utilizing plasma resonance of island-like metal particles. This document describes that the resonance wavelength of aluminum particles is shorter than the resonance wavelength of silver particles by about 200 nm, and hence that there is a possibility that use of aluminum particles may make it possible to produce a polarizing plate that covers the visible light range.

PTL 2 describes some methods for producing polarizing plates using aluminum particles. It is described that silicate-based glass is not suitable as a substrate because aluminum and the glass react with each other, but that calcium aluminoborate glass is suitable (paragraphs [0018] and [0019]). However, glass using a silicate is widespread as optical glass, and highly reliable commercial products of this glass are available at low prices. Therefore, it is not economically favorable if this glass is not suitable. A method for forming island-like particles by etching a resist pattern is also described (paragraphs [0037] and [0038]). Typically, a polarizing plate used in a projector is required to have a size of about some centimeters and a high extinction ratio. Hence, for obtaining a polarizing plate for visible light, the resist pattern size needs to be a size of some tens of nanometers, which is sufficiently shorter than the visible light wavelength, and patterns need to be formed at a high density in order to obtain a high extinction ratio. Furthermore, for use in a projector, patterns covering a large area need to be formed. However, the described method of applying formation of high-density minute patterns by lithography requires use of electron beam lithography in order to obtain such patterns. Electron beam lithography is a method of drawing each pattern with an electron beam, and is poorly productive and impractical.

PTL 2 also describes removal of aluminum with a chlorine plasma. Typically, such etching results in adhesion of a chloride on side walls of the aluminum patterns. Commercially available wet etching liquids (for example, SST-A2 available from Tokyo Ohka Kogyo Co., Ltd.) can remove the chloride. However, these kinds of liquid medicines that react with aluminum chloride also react with aluminum, although at a low etching rate. Therefore, it is difficult to realize the desired pattern shape with the described method.

As another method, PTL 2 also describes a method of depositing aluminum on a patterned photoresist by oblique film formation and removing the photoresist (paragraphs [0045] and [0047]). However, it is considered that this method also needs to deposit aluminum on the substrate surface to some degree in order to obtain close adhesiveness between the substrate and aluminum. However, this means that the shape of the deposited aluminum films is different from the prolate sphere, which is the suitable shape described in paragraph [0015] and includes a prolate ellipsoid. It is also described in paragraph [0047] that an excessive deposit is removed by anisotropic etching perpendicular to the surface. In order to obtain the function as the polarizing plate, shape anisotropy of aluminum is extremely important. Accordingly, it is considered necessary to adjust the amounts of aluminum to be deposited on the resist portions and the substrate surface such that a desired shape can be obtained by etching. However, it is considered extremely difficult to obtain this control on a size condition described in paragraph [0047], i.e., 0.05 micrometers, which is equal to or less than submicron. It is doubted that this is suitable as a producing method having a high productivity. Further, as a property of the polarizing plate, a high transmittance is required in the transmission axis direction. Typically, when glass is used as the substrate, some percent of reflection from the glass interface is unavoidable, and a high transmittance is difficult to obtain.

PTL 3 describes a polarizing plate obtained by oblique deposition. This method for obtaining a polarizing property by producing minute columnar structures by oblique deposition of materials that are transparent and opaque to the wavelengths in the range used. Unlike PTL 2, minute patterns can be obtained with a simple method. Therefore, this method can be considered a highly productive method, but also has a problem. The aspect ratio of the minute columnar structures to be formed of the material opaque to the range used, the intervals between the individual minute columnar structures, and linearity of the individual minute columnar structures are important factors for obtaining a good polarizing property, and should be intentionally controlled from the viewpoint of the repeatability of the property. However, this method utilizes a phenomenon that a columnar structure is obtained by to-be-vapor-deposited particles to come flying next not being deposited on the shadow portion of an initially deposited layer of vapor-deposited particles. Therefore, it is difficult to intentionally control the factors described above. As a method for improving this, a method of providing polishing scars on the substrate by a rubbing treatment before vapor deposition is described. However, the particle diameter of the vapor-deposited film is typically about some tens of nanometers at the maximum, and it is necessary to intentionally produce a pitch equal to or less than submicron by polishing in order to control the anisotropy of such particles. However, the limit of, for example, a common polishing sheet is about submicron, and it is not easy to produce such minute polishing scars. Further, as described above, the resonance wavelength of Al particles is largely dependent on the surrounding refractive index. In this case, the combination of the transparent and opaque materials is important. However, PTL 3 does not describe a combination for obtaining a good polarizing property in a visible light range. Further, like PTL 2, when glass is used as the substrate, some percent of reflection from the glass interface is unavoidable.

NPL 2 describes a polarizing plate called LAMIPOL used for infrared communication. This has a laminated structure formed of Al and $SiO_2$. According to this document, an extremely high extinction ratio is exhibited. NPL 3 describes that use of Ge instead of Al to be responsible for light absorption of LAMIPOL can realize a high extinction ration for a wavelength of 1 micrometer or less. Furthermore, from FIG. 3 of the same material, it is expected that a high extinction ratio can also be obtained with Te (tellurium). As can be understood, LAMIPOL is an absorptive polarizing plate that can obtain a high extinction ratio. However, because the thickness of the laminated layers of a light absorbing material and a transmissive material is the size of the light receiving surface, it is not suitable as a polarizing plate for a projector that needs to have a size of some centimeters square.

PTL 4 discloses a polarizing plate obtained by combining a wire grid structure and an absorbing film. When a metal or a semiconductor film is used as the absorbing film, the reflectance for a specific range can be reduced by adjusting the thickness of a dielectric film between the material, the wire grid, and the absorbing film, because the optical property of the material is strongly influential. However, it is difficult to realize this in a wide wavelength range.

Use of Ta and Ge that have a high absorbency makes it possible to broaden the range, but makes absorbency in the transmission axis direction high at the same time. This reduces the transmittance in the transmission axis direction, which is the important property as the polarizing plate.

Accordingly, currently, it is required to provide an inorganic polarizing plate having an excellent polarizing property and a method for producing the same.

CITATION LIST

Patent Literature

PTL 1: U.S. Pat. No. 6,772,608
PTL 2: Japanese Patent Application Laid-Open (JP-A) No. 2000-147253
PTL 3: JP-A No. 2002-372620
PTL 4: JP-A No. 2008-216957

Non-Patent Literature

NPL 1: J. Opt. Soc. Am. A, Vol. 8, No. 4, 619-624
NPL 2: Applied Optics, Vol. 25, No. 2 1986 311-314
NPL 3: J. Lightwave Tec., Vol. 15, No. 6, 1997, 1042-1050

SUMMARY OF INVENTION

Technical Problem

The present invention aims for solving the various problems in the related art and achieving an object described below. That is, the present invention has an object to provide an inorganic polarizing plate that has an excellent polarizing property with a high transmittance and a low reflectance, and a method for producing the same.

Solution to Problem

Means for solving the above problems are as follows.
<1> An inorganic polarizing plate, including in the order of reciting:
a substrate that is transparent to light in a range used;
a plurality of linear metal layers;
a plurality of linear dielectric layers; and
a plurality of linear light absorbing layers having a light absorbing effect,
wherein the plurality of linear metal layers are arranged on the substrate in a state of being apart from each other at intervals shorter than a wavelength of the light,
wherein the plurality of linear dielectric layers are arranged on the plurality of linear metal layers respectively,
wherein the plurality of linear light absorbing layers are arranged on the plurality of linear dielectric layers respectively, and wherein the linear metal layers have hollow portions.

<2> The inorganic polarizing plate according to <1>,
wherein an average particle diameter of particles in the linear metal layers is 60 nm or greater.

<3> The inorganic polarizing plate according to <1> or <2>,
wherein an average thickness of the linear metal layers is from 20 nm through 400 nm.

<4> The inorganic polarizing plate according to any one of <1> to <3>,
wherein a material of the linear metal layers is any one of aluminum and an aluminum alloy.

<5> The inorganic polarizing plate according to any one of <1> to <4>,
wherein a material of the linear dielectric layers is $SiO_2$.

<6> The inorganic polarizing plate according to any one of <1> to <5>,
wherein a material of the linear light absorbing layers is any one of Si and silicide.

<7> The inorganic polarizing plate according to <6>,
wherein the silicide is silicide that contains Fe in an amount of 10 atm % or less.

<8> The inorganic polarizing plate according to <6>,
wherein the silicide is silicide that contains Ta in an amount of 40 atm % or less.

<9> The inorganic polarizing plate according to any one of <1> to <8>,
wherein a material of the substrate is any one of glass, crystal, and sapphire.

<10> The inorganic polarizing plate according to any one of <1> to <9>,
wherein at least one transparent film having a refractive index lower than a refractive index of the substrate is laminated at an interface between the substrate and the linear metal layers.

<11> A method for producing the inorganic polarizing plate according to any one of <1> to <10>, the method including:
a metal layer etching step of etching a metal layer formed on a substrate using an etching gas containing $Cl_2$.

<12> The method for producing the inorganic polarizing plate according to <11>, wherein the etching gas contains $N_2$ and $BCl_3$.

Advantageous Effects of Invention

The present invention can solve the various problems in the related art, achieve the object described above, and provide an inorganic polarizing plate that has an excellent polarizing property with a high transmittance and a low reflectance, and a method for producing the same.

DESCRIPTION OF EMBODIMENTS (Inorganic Polarizing Plate)

Figure 1A:
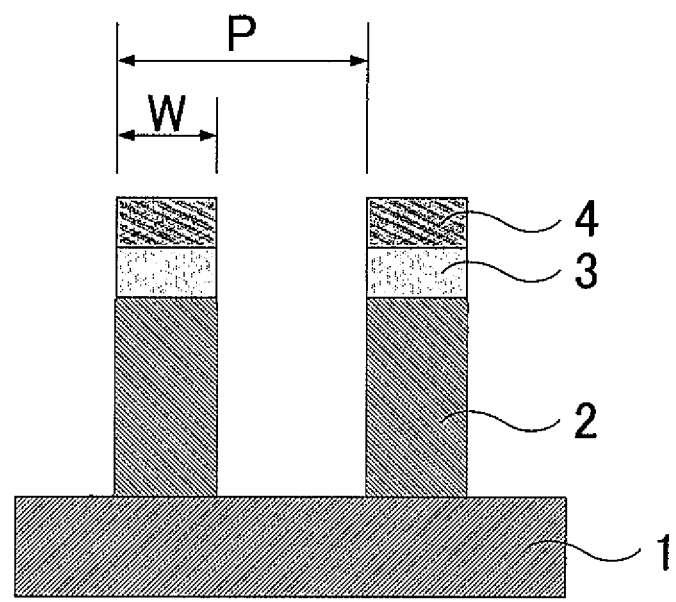
FIG. 1A is a schematic cross-sectional view illustrating an example of a laminated state of an inorganic polarizing plate of the present invention.

An inorganic polarizing plate of the present invention includes at least a substrate, a plurality of linear metal layers, a plurality of linear dielectric layers, and a plurality of linear light absorbing layers in this order, and further includes other members as needed.

The inorganic polarizing plate is a so-called wire grid polarizing plate.

The present inventor has found that an inorganic polarizing plate that includes at least a substrate, a plurality of linear metal layers, a plurality of linear dielectric layers, and a plurality of linear light absorbing layers in this order has a good polarizing property. As a result of earnest studies for improving a polarizing property, the present inventor has also found that an inorganic polarizing plate that includes at least a substrate, a plurality of linear metal layers, a plurality of linear dielectric layers, and a plurality of linear light absorbing layers in this order can obtain an excellent polarizing plate when the linear metal layers have hollow portions, and has completed the present invention.

<Substrate>

The material, shape, size, and structure of the substrate are not particularly limited and may be appropriately selected depending on the intended purpose, so long as the substrate is transparent to light in a range used.

The light in the range used is not particularly limited and may be appropriately selected depending on the intended purpose. Examples of the light in the range used includes visible light. Examples of the visible light include light of from 380 nm through 810 nm.

The substrate being transparent to the light in the range used does not mean that the transmittance through the substrate is 100%. The substrate needs only to be transparent to a range in which the substrate has the function as the inorganic polarizing plate.

Example of the material of the substrate include glass, quartz, and sapphire. Among these materials, glass is preferable in terms of costs and transmittance.

As the material of the substrate, a material having a refractive index of from 1.1 through 2.2 is preferable.

The average thickness of the substrate is not particularly limited, may be appropriately selected depending on the intended purpose, and is preferably from 300 micrometers through 1,000 micrometers.

<Plurality of Linear Metal Layers>

In the inorganic polarizing plate, the plurality of linear metal layers are arranged on the substrate in a state of being apart from each other at intervals shorter than the wavelength of the light. The linear metal layers have hollow portions.

The cross-sectional shape of the linear metal layers in a cross-section orthogonal to the longer direction of the linear metal layers is not particularly limited and may be appropriately selected depending on the intended purpose. Examples of the cross-sectional shape include an approximately rectangular shape and a trapezoidal shape.

The plurality of linear metal layers may contact the substrate, or the inorganic polarizing plate may include, for example, a base layer described below between the plurality of linear metal layers and the substrate.

The material of the linear metal layers is not particularly limited and may be appropriately selected depending on the intended purpose. Examples of the material of the linear metal layers include Al and an Al alloy. Examples of the Al alloy include an AlSi alloy.

It is preferable that the linear metal layers contain any one of Al and an AlSi alloy, in terms of the polarizing property and process easiness.

The average thickness of the linear metal layers is not particularly limited, may be appropriately selected depending on the intended purpose, and is preferably from 20 nm through 400 nm in terms of the polarizing property.

In the present specification, the average thickness refers to an arithmetic mean value of heights of the approximately rectangular or trapezoidal metal layers in a cross-section orthogonal to the longer direction of the linear metal layers. The average thickness can be obtained by, for example, scanning electron microscopic observation or transmission electron microscopic observation. For example, the height is measured at arbitrary 10 positions, and the average thickness is obtained from the arithmetic mean value of the measurements.

The average width of the linear metal layers is not particularly limited, may be appropriately selected depending on the intended purpose, and is preferably from 20% through 60% of the average interval between the plurality of linear metal layers in terms of the polarizing property and process stability.

The average width of the linear metal layers can be obtained by, for example, scanning electron microscopic observation or transmission electron microscopic observation. For example, the width of 4 linear metal layers are measured at arbitrary positions, and the average width is obtained from the arithmetic mean value of the measurements. Note that the width is measured at the top of the linear metal layers.

The average interval between the plurality of linear metal layers is not particularly limited, may be appropriately selected depending on the intended purpose, and is preferably from 50 nm through 200 nm and more preferably from 80 nm through 150 nm in terms of the ease of production and stability.

The average interval can be obtained by, for example, scanning electron microscopic observation or transmission electron microscopic observation. For example, the interval (pitch) between the linear metal layers is measured at arbitrary 4 positions, and the average interval is obtained from the arithmetic mean value of the measurements. The interval (pitch) refers to the distance between adjoining 2 linear metal layers, measured between an edge of the top portion of one of the linear metal layers at the side of the other linear metal layer and an edge of the top portion of the other linear metal layer on the side opposite to the one linear metal layer side.

<<Hollow Portions>>

The linear metal layers have hollow portions.

The hollow portions can be formed in the linear metal layers during formation of the linear metal layers by etching of a metal layer according to a producing method described below. A detailed description of the producing method for forming the hollow portions will be presented below.

The present inventor has found it possible to obtain an inorganic polarizing plate having a high transmittance and a low reflectance by incorporating layers formed of, for example, air, which is a material having a high transmittance and a low refractive index, in the configuration of the inorganic polarizing plate, because this makes the structure optically optimal. Further, the present inventor has found that hollow portions formed in the linear metal layers as the air layers function effectively, and that the hollow portions can be formed in the linear metal layers during etching of a metal layer, by appropriately selecting the producing conditions for forming the hollow portions in the linear metal layers, such as considering the average particle diameter of particles in the metal layer, the material to be used, and etching conditions.

The inorganic polarizing plate of the present invention having the hollow portions in the linear metal layers exhibits a high transmittance and a low reflectance.

The average particle diameter of particles in the linear metal layers is preferably 60 nm or greater.

When the average particle diameter is 60 nm or greater, the hollow portions can be formed easily during etching of a metal layer.

Figure 5A:
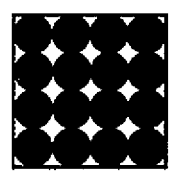
FIG. 5A is an image diagram illustrating an average particle diameter defined in the present invention.
Figure 5B:
FIG. 5B is an image diagram illustrating an average particle diameter defined in the present invention.

The average particle diameter is obtained according to a formula (1) below, based on the area of a measurement area and the number of particles obtained by a measuring method described below on the assumption that the particles are spherical and arranged within a square shape (see FIG. 5A). That is, the average particle diameter refers to a value equivalent to a particle diameter (PS) of one particle illustrated in FIG. 5B.

$$\text{Average particle diameter} = \sqrt{(\text{area of measurement area}/\text{number of particles})} \quad \text{Formula (1)}$$

—Measuring Method for Obtaining Average Particle Diameter—

A metal layer is observed with an AFM (atomic force microscope). The number of particles present within a desired measurement area (for example, the area of the measurement area in FIG. 6A is 0.5 micrometers×0.5 micrometers) is counted.

Figure 6A:
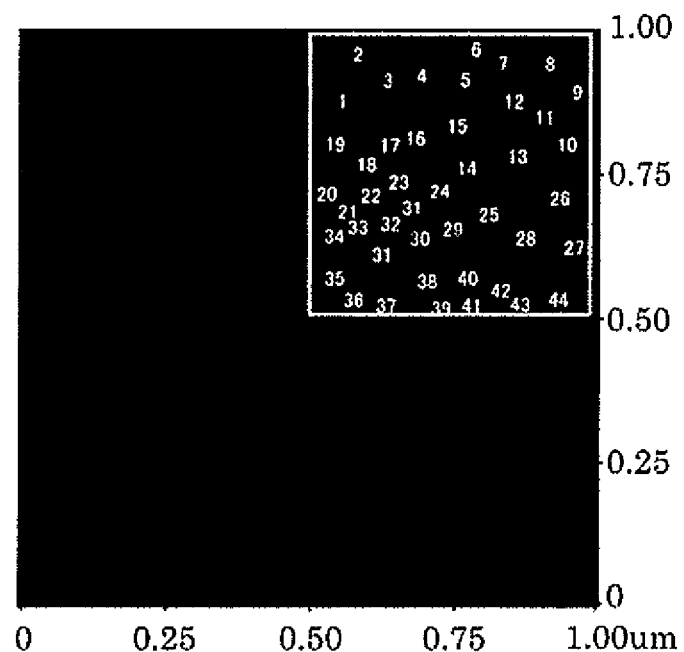
FIG. 6A is an AFM (atomic force microscopic) image used for counting the number of particles in a metal layer in Test Example 2.

In FIG. 6A, the number of particles is 44. This number is assigned in the formula (1) above. As a result, the average particle diameter is obtained as 75.4 nm.

Figure 1B:
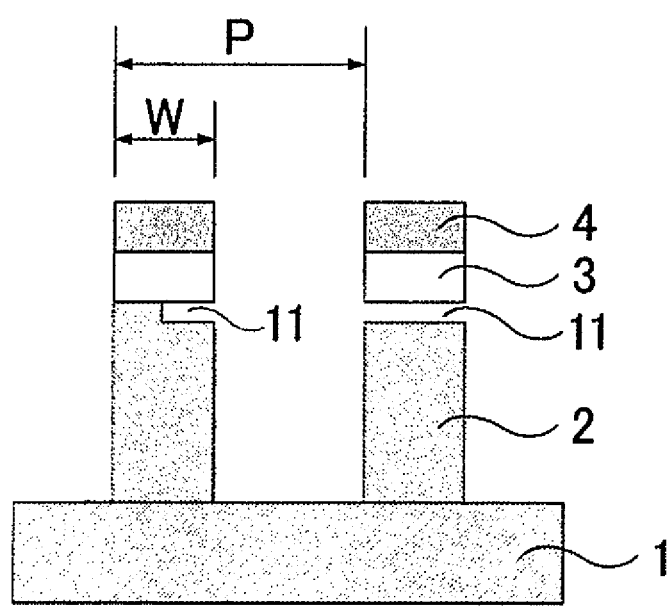
FIG. 1B is a schematic cross-sectional view of an example of an inorganic polarizing plate of the present invention.

In the present invention, the hollow portions refer to the portions denoted by reference numeral 11, which are illustrated in the linear metal layers 2 in the cross-sectional view illustrated in FIG. 1B.

Figure 9:
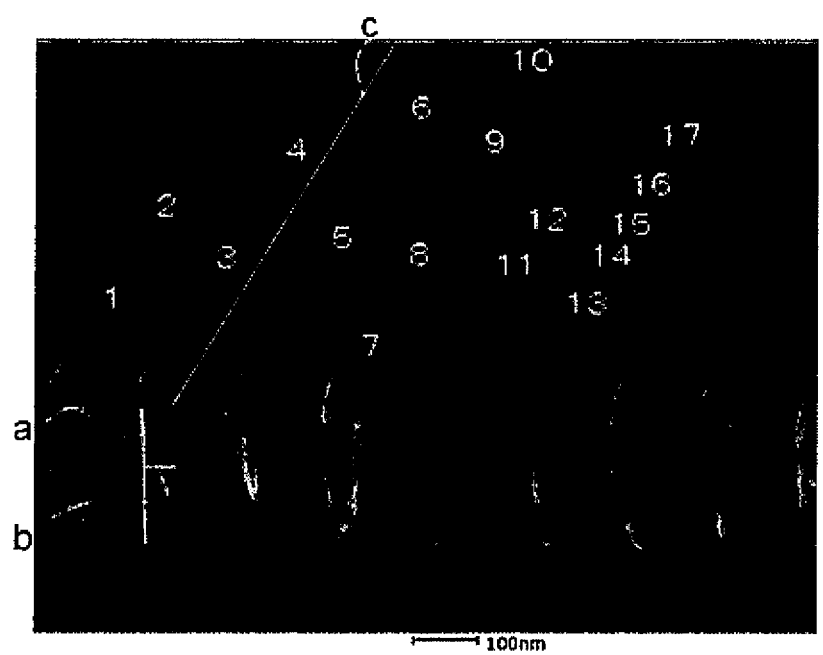
FIG. 9 is a cross-sectional image of an inorganic polarizing plate, which is a sample in Test Example 3.

The hollow portions 11 are present dispersedly in the linear metal layers 2. Whether the hollow portions are formed or not can be confirmed by, for example, an image of a cross-sectional shape obtained with a scanning electron microscope (SEM). In FIG. 9, a plurality of linear metal layers 2 having a height a and a width b are formed along a direction of depth c. In FIG. 9, from 2 through 5 hollow portions 11 are formed in 1 linear metal layer along the depth of 635 nm. Hence, in the present invention, it is preferable that the ratio at which the hollow portions 11 occupy the linear metal layer 2 be from 0.1% through 15%, more preferably from 0.3% through 14%, and yet more preferably 0.3% through 3.5% when the ratio of the area of the hollow portions to the area of the linear metal layer obtained based the height and the depth is calculated.

It is preferable that the hollow portions be formed in the linear metal layers 2 near the interface to the dielectric layers. Here, a desirable state of the hollow portions being formed near the interface is a state that the hollow portions are formed in a region of the linear metal layer 2 that is within 100 nm from the dielectric layer 3 at a ratio of 0.1% or greater in an in-plane direction along the depth c of the linear metal layer 2.

As used herein, hollow portions being formed refers to a state that 1 or more hollow portions greater than about 1 nm are present in the SEM image area having a vertical length of 550 nm and a horizontal length of 1,100 nm as illustrated in FIG. 9.

A gas such as air and an etching gas is present in the hollow portions. It is preferable that air be present.

<Plurality of Linear Dielectric Layers>

The plurality of linear dielectric layers are arranged on the plurality of linear metal layers respectively.

The material of the linear dielectric layers is not particularly limited and may be appropriately selected depending on the intended purpose. Examples of the material of the linear dielectric layers include $SiO_2$, $Al_2O_3$, and $MgF_2$.

The cross-sectional shape of the linear dielectric layers in a cross-section orthogonal to the longer direction of the linear dielectric layers is not particularly limited and may be appropriately selected depending on the intended purpose. Examples of the cross-sectional shape of the linear dielectric layers include an approximately rectangular shape and a trapezoidal shape.

The average thickness of the linear dielectric layers is not particularly limited, may be appropriately selected depending on the intended purpose, and is preferably from 1 nm through 500 nm and more preferably from 3 nm through 80 nm.

The average thickness can be obtained in the same manner as obtaining the average thickness of the linear metal layers.

<Plurality of Linear Light Absorbing Layers>

The plurality of linear light absorbing layers are arranged on the plurality of linear dielectric layers respectively.

The linear light absorbing layers have a light absorbing effect.

Here, the light absorbing effect means an effect of attenuating a polarized light wave (TE wave (S wave)) having an electric field component parallel with a lattice (grid) formed in the inorganic polarizing plate. The linear light absorbing layers are transmissive of a polarized light wave (TM wave (P wave)) having an electric field component perpendicular to the lattice.

A TE wave is attenuated by the light absorbing effect of the linear absorbing layers. The linear metal layers having a lattice shape function as a wire grid and reflect the TE wave that has passed through the linear absorbing layers and the dielectric layers. When the TE wave reflected by the linear metal layers passes and is transmitted through the linear absorbing layers, the TE wave is partially absorbed and partially reflected to return to the linear metal layers, with an appropriate adjustment of the thickness and refractive index of the dielectric layers. Light that has passed through the linear absorbing layer is attenuated due to interference. Through the selective attenuation of the TE wave in this way, a desired polarizing property can be obtained.

The material of the linear light absorbing layers is not particularly limited and may be appropriately selected depending on the intended purpose so long as the linear light absorbing layers have the light absorbing effect. Examples of the material of the linear light absorbing layers include metals, semiconductors, and metal-containing semiconductors. Examples of the metals include Al, Au, Ag, Cu, and alloys of these metals. Examples of the semiconductors include Si, Ge, Te, and ZnO. Examples of metals contained in the metal-containing semiconductors include Ta, Al, Ag, Cu, Au, Mo, Cr, Ti, W, Ni, Fe, Sn, and Nb. Examples of the metal-containing semiconductors include silicides. Examples of the silicides include $\beta$-$FeSi_2$, $MgSi_2$, $NiSi_2$, $BaSi_2$, $CrSi_2$, $CoSi_2$, TaSi, and WSi.

Among these materials, Si and silicides are preferable because an inorganic polarizing plate having a high contrast (extinction ratio: transmittance of a transmission axis/transmittance of an absorption axis) in the visible range can be obtained. As the silicide, for example, a Fe-containing silicide and a Ta-containing silicide are preferable.

The metal content in the metal-containing semiconductor is not particularly limited, may be appropriately selected depending on the intended purpose, and is preferably 50 atm % (atomic percent) or less. When the metal content is greater than 50 atm %, the transmittance may be poor.

When the Fe-containing silicide is used as the metal-containing semiconductor, the Fe content is preferably 50 atm % or less. When the Fe content is greater than 50 atm %, etching of the Fe-containing silicide may be difficult, even with some adjustment of the gas species. Furthermore, the Fe content is preferably 10 atm % or less, in order to enable etching with $CF_4$, which is widely used in semiconductor etching processes.

When the Ta-containing silicide is used as the metal-containing semiconductor, the Ta content is preferably 40 atm % or less and more preferably 30 atm % or less. When the Ta content is in the range of 40 atm % or less, the reflectance is 4% or less, which is comparable to the level of a glass interface, and the transmittance is high. Therefore, in practical use, it is possible to maintain reflectance reduction and a high transmittance.

The linear light absorbing layers may have a single-layer structure or a multi-layer structure. For example, the linear light absorbing layers may be a single layer structure formed of a metal-containing semiconductor, or a 2-layer structure formed of a metal or a semiconductor and a metal-containing semiconductor.

When the linear light absorbing layers have a 2-layer structure formed of a metal or a semiconductor and a metal-containing semiconductor, it is possible to suppress reflection and improve transmittance, leading to an increased contrast.

The average thickness of the linear absorbing layers is not particularly limited, may be appropriately selected depending on the intended purpose, and is preferably from 1 nm through 100 nm, more preferably from 5 nm through 80 nm, and particularly preferably from 10 nm through 40 nm.

The average thickness can be obtained in the same manner as obtaining the average thickness of the linear metal layers.

<Other Members>

The other members are not particularly limited and may be appropriately selected depending on the intended purpose. Examples of the other members include a base layer and a protective layer.

<<Base Layer>>

For example, the base layer is disposed between the substrate and the plurality of linear metal layers. For the purpose of improving transmittance, the base layer is preferably a transparent film having a lower refractive index than the refractive index of the substrate.

Further, the material constituting the base layer is not particularly limited and may be appropriately selected depending on the intended purpose. Examples of the material of the base layer include dielectric materials such as $SiO_2$ and $Al_2O_3$. Above all, it is more preferable that the base layer be a $SiO_2$ layer, because a high transmittance is more likely to be obtained because the $SiO_2$ layer has a refractive index close to the refractive index of glass and has a good etchability.

The average thickness of the base layer is not particularly limited, may be appropriately selected depending on the intended purpose, and is preferably from 3 nm through 80 nm in terms of the polarizing property.

<<Protective Layer>>

For example, the protective layer is disposed in a manner to cover the linear light absorbing layers. For such purposes as betterment of reliability such as humidity resistance, the protective layer may be disposed on the topmost portion of the inorganic polarizing plate within a range in which an optical property change does not give influence on application.

The material of the protective layer is not particularly limited and may be appropriately selected depending on the intended purpose. Examples of the material of the protective layer include $SiO_2$.

With the protective layer, the inorganic polarizing plate can have an improved reliability.

The method for producing the inorganic polarizing plate is not particularly limited and may be appropriately selected depending on the intended purpose. The following method for producing the inorganic polarizing plate is preferable.

FIG. 1A illustrates a schematic cross-sectional view illustrating an example of a laminated state of the inorganic polarizing plate of the present invention. The inorganic polarizing plate illustrated in FIG. 1 includes a substrate 1, linear metal layers 2, linear dielectric layers 3, and linear light absorbing layers 4. In FIG. 1, the linear metal layers 2, the linear dielectric layers 3, and the linear light absorbing layers 4 are disposed on the substrate 1 in this order.

P indicated in FIG. 1 corresponds to the interval (pitch) between 2 linear metal layers 2, and W corresponds to the width of the linear metal layers 2.

Light is incident to the inorganic polarizing plate of the present invention from the linear light absorbing layers 4 side.

FIG. 1B illustrates a schematic cross-sectional view of an example of the inorganic polarizing plate of the present invention. The inorganic polarizing plate of the present invention has hollow portions 11 in the linear metal layers 2 near the interface to the linear dielectric layers 3.

Figure 3:
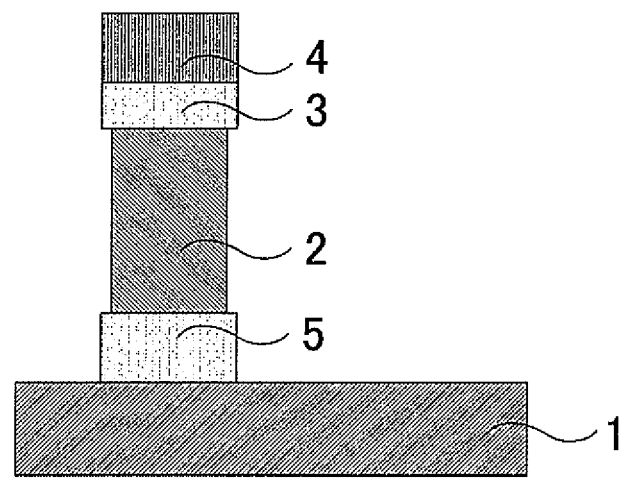
FIG. 3 is a schematic cross-sectional view illustrating another example of a laminated state of an inorganic polarizing plate of the present invention.

FIG. 3 illustrates a schematic cross-sectional view illustrating another example of a laminated state of the inorganic polarizing plate of the present invention. It is preferable that the inorganic polarizing plate of the present invention include a base layer 5 formed of a dielectric layer between the substrate 1 and the linear metal layers 2.

(Method for Producing Inorganic Polarizing Plate)

The method for producing the inorganic polarizing plate of the present invention includes at least a metal layer etching step, and further includes other steps as needed.

<Metal Layer Etching Step>

The metal layer etching step is a step of etching a metal layer formed on a substrate with an etching gas containing $Cl_2$.

By the etching, a plurality of linear metal layers are formed on the substrate, being arranged in a state of being apart from each other at intervals shorter than a wavelength of light. During this, hollow portions 11 are formed in the linear metal layers 2 near the interface to the linear dielectric layers 3.

The etching gas is not particularly limited and may be appropriately selected depending on the intended purpose so long as the etching gas contains $Cl_2$. It is preferable that the etching gas contain $N_2$ and $BCl_3$.

By the etching gas containing $N_2$, the side surfaces of the linear metal layers can have reduced roughness. This can further improve the polarizing property.

An example of the method for producing the inorganic polarizing plate of the present invention will be described with reference to the drawings.

Figure 2A:
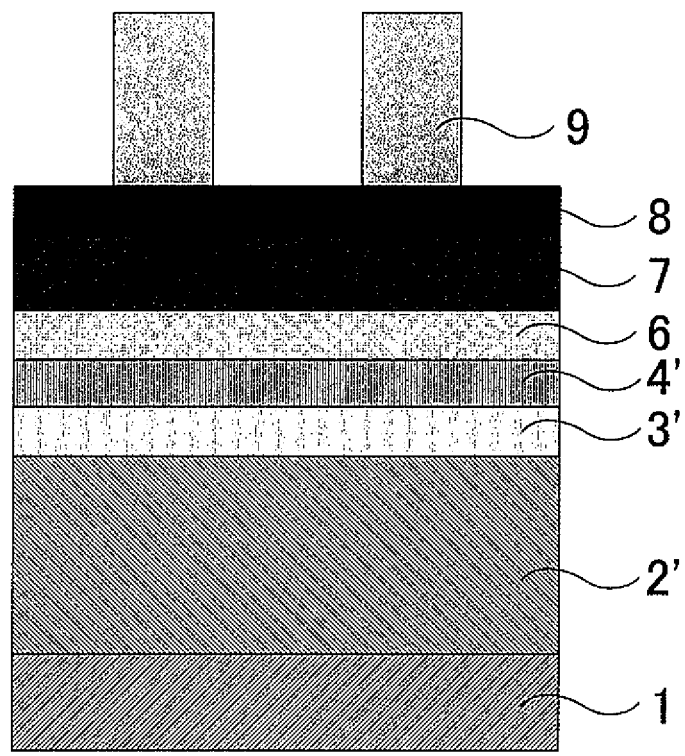
FIG. 2A is a schematic cross-sectional view illustrating an example of a method for producing an inorganic polarizing plate of the present invention (part 1)

First, a laminated body in which a metal layer 2', which is the precursor of the linear metal layers, a dielectric layer 3', which is the precursor of the linear dielectric layers, a light absorbing layer 4', which is the precursor of the linear light absorbing layers, a first mask layer 6, a second mask layer 7, a reflection preventing layer 8, and a patterned resist film 9 are laminated on a substrate 1 in this order is prepared (FIG. 2A).

The material of the resist film is not particularly limited and may be appropriately selected depending on the intended purpose.

The method for forming the patterned resist film is not particularly limited and may be appropriately selected depending on the intended purpose. Examples of the method include nanoimprint and photolithography.

The method for forming the metal layer, the dielectric layer, the light absorbing layer, the first mask layer, the second mask layer, and the reflection preventing layer is not particularly limited and may be appropriately selected depending on the intended purpose. Examples of the method include a vapor deposition method, a sputter method, and a spin cast method.

The material of the first mask layer is not particularly limited and may be appropriately selected depending on the intended purpose. Examples of the material of the first mask layer include $SiO_2$.

The material of the second mask layer is not particularly limited and may be appropriately selected depending on the intended purpose. Examples of the material of the second mask layer include aluminum.

The material of the reflection preventing layer is not particularly limited and may be appropriately selected depending on the intended purpose.

Figure 2B:
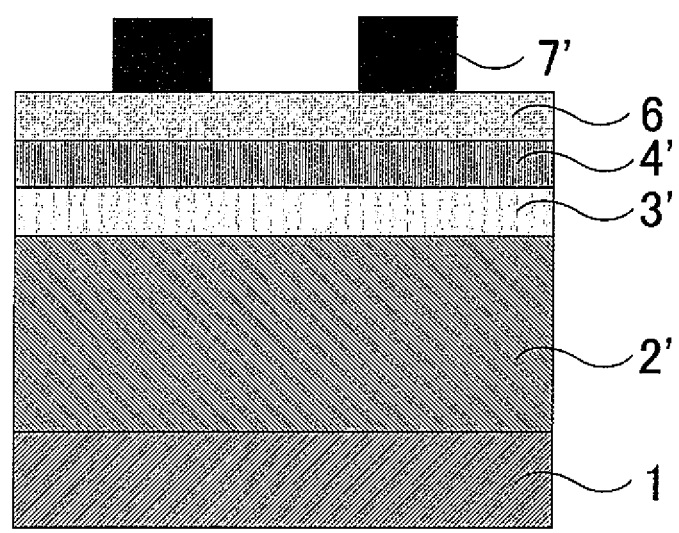
FIG. 2B is a schematic cross-sectional view illustrating an example of a method for producing an inorganic polarizing plate of the present invention (part 2)

Subsequently, with the patterned resist film 9 used as a mask, the reflection preventing layer 8 and the second mask layer 7 are etched, and the remaining patterned resist film 9 and reflection preventing layer 8 are removed (FIG. 2B).

Etching of the reflection preventing layer 8 is performed by, for example, dry etching using $O_2$ (more specifically, dry etching using $Ar/O_2$). Etching of the second mask layer 7 is performed by, for example, dry etching using $Cl_2$ (more specifically, dry etching using $Cl_2/BCl_3$). The method for removing the remaining patterned resist film 9 and reflection preventing film 8 is not particularly limited and may be appropriately selected depending on the intended purpose.

Figure 2C:
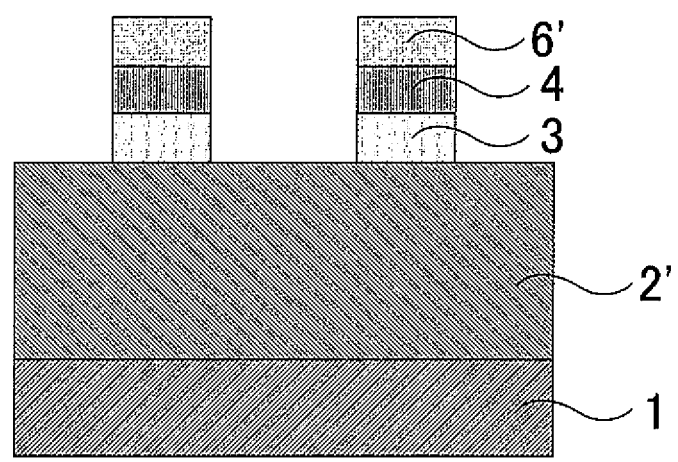
FIG. 2C is a schematic cross-sectional view illustrating an example of a method for producing an inorganic polarizing plate of the present invention (part 3)

Subsequently, with the patterned second mask layer 7' used as a mask, the first mask layer 6, the light absorbing layer 4', and the dielectric layer 3' are etched, and the remaining patterned second mask layer 7' is removed (FIG. 2C).

Here, etching is performed by dry etching using $CF_4$ (more specifically, dry etching using $CF_4/Ar$).

Figure 2D:
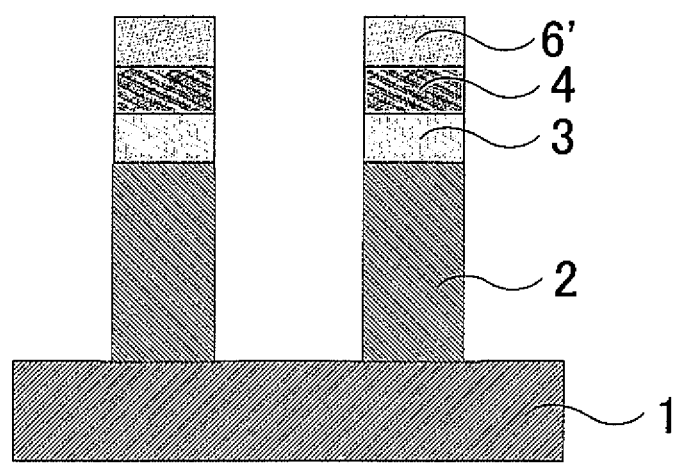
FIG. 2D is a schematic cross-sectional view illustrating an example of a method for producing an inorganic polarizing plate of the present invention (part 4)

Subsequently, with the patterned first mask layer 6' used as a mask, the metal layer 2' is etched, to obtain linear second layers 2 (FIG. 2D).

Here, etching is performed by dry etching using $Cl_2$ (more specifically, dry etching using $Cl_2/BCl_3/N_2$). With $N_2$ contained in the etching gas, the side surfaces of the linear metal layers can have reduced roughness, and an inorganic polarizing plate having a better polarizing property can be obtained.

Figure 2E:
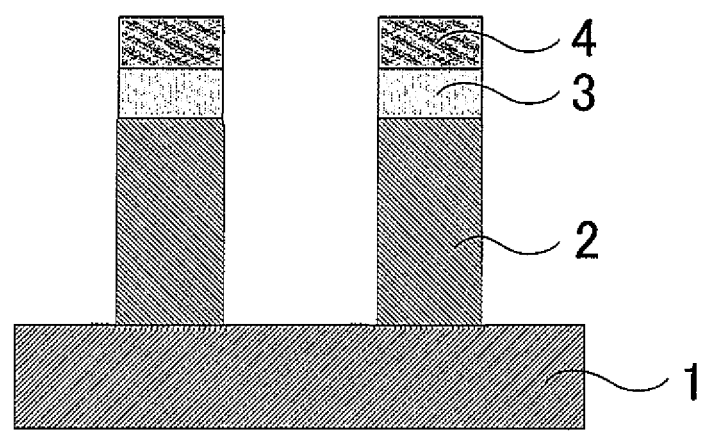
FIG. 2E is a schematic cross-sectional view illustrating an example of a method for producing an inorganic polarizing plate of the present invention (part 5)

Subsequently, the patterned first mask layer 6' is removed, to thereby obtain an inorganic polarizing plate (FIG. 2E).

It is possible to employ a mode in which the patterned first mask layer 6' ($SiO_2$ mask layer) is not completely removed, but is partially left unremoved to serve as a protective layer.

In the foregoing description, the process using 2 layers of etching mask films is employed. However, it is also possible to employ a producing method of doing without the second mask layer (Al) by forming a lattice-shaped mask pattern on the first mask layer ($SiO_2$) by nanoimprint or photolithography.

When a material such as Al or AlSi that is to be etched with a chlorine-based gas is used as the metal layer, it is desirable to select materials that have a good reactivity with fluorine and a low reactivity with chlorine as the materials of the dielectric layer/absorbing layer/etching mask layers to be formed on the metal layer.

By doing so, it is possible to simplify the etching process, which improves the productivity and makes it easier to form a lattice shape having a high perpendicularity.

<<Formation of Hollow Portions>>

In the production steps from FIG. 2C to FIG. 2D, the metal layer 2' is etched, to thereby form linear metal layers 2. Here, with the use of an etching gas containing $Cl_2$, the $Cl_2$ gas comes into the interface between the linear metal layers 2 and the linear dielectric layers 3. By the $Cl_2$ gas that comes into the interface, hollow portions are formed near the interface of the linear metal layers.

By adjusting the particle density in the film to a rough level by optimization of the composition of the material constituting the metal layer and the film forming condition, it become easier for the $Cl_2$ gas to come into the interface between the linear metal layers 2 and the linear dielectric layers 3, resulting in formation of the hollow portions.

Figure 4:
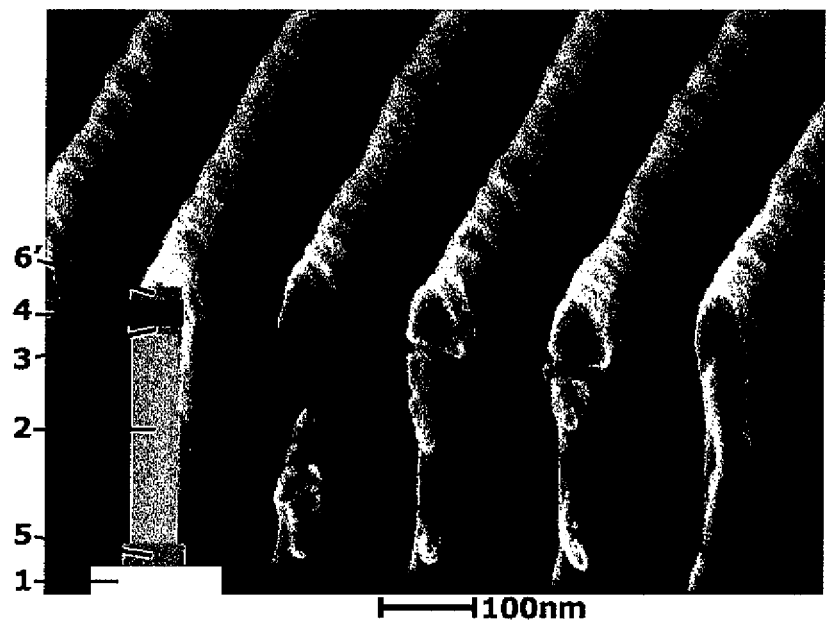
FIG. 4 is an example of a scanning electron microscopic (SEM) image illustrating a cross-sectional shape of an inorganic polarizing plate of the present invention.

The state in which the hollow portions are formed at the interface between the linear metal layers 2 and the linear dielectric layers 3 as a result of etching of the metal layer 2' is illustrated with a scanning electron microscopic (SEM) image of a cross-sectional shape (FIG. 4).

For forming the hollow portions, it is preferable to consider the average particle diameter of the particles in the metal layer. For example, when using Al or an Al alloy as the metal layer, it is possible to adjust the particle density of Al-containing particles in the metal layer, by changing the amount of Si to be added to Al. As a result of confirmation by a test example in which Al or an Al alloy was used, it was found effective to set the particle density of the particles to a rough level (average particle diameter>60 nm) in order to form the hollow portions (see Test Example 2 below).

In the present invention, the average particle diameter of the particles in the metal layer is preferably 60 nm or greater.

Further, in order to form the hollow portions, it is desirable to consider the etching conditions such as a gas flow rate, a gas pressure, a power, and a substrate cooling temperature.

EXAMPLES

Examples of the present invention will be described below. However, the present invention should not be construed as being limited to these Examples.

Text Example 1

An electromagnetic field simulation was performed by a Rigorous Coupled Wave Analysis (RCWA) using a grating simulator GSOLVER available from Grating Solver Development Company.

For an inorganic polarizing plate that had the laminated structure illustrated in FIG. 1A and in which air layers (which were hollow portions in which air was present) were formed at the interface between the linear metal layers 2 and the linear dielectric layers 3, a polarizing property when the size of the air layers was changed was evaluated in the electromagnetic field simulation.

In the inorganic polarizing plate of FIG. 1A, a base layer 5 ($SiO_2$: 35 nm), linear metal layers 2 (Al: 180 nm), linear dielectric layers 3 ($SiO_2$: 12.5 nm), and linear light absorbing layers 4 (FeSi (Fe 5 atm %): 20 nm) were formed on a substrate 1 (glass) in this order. The interval (P: pitch) in the lattice was 150 nm and the width (W) was 45 nm.

A polarizing property for 400 nm through 700 nm when light was made incident from the linear light absorbing layers 4 side was evaluated.

The results of evaluation of this inorganic polarizing plate in which no air layers were formed are presented in Table 1-1 and Table 1-2 as Condition 1.

Next, a polarizing property of the inorganic polarizing plate used in Condition 1 was evaluated in the same manner as in Condition 1, except that air layers (with a thickness, a so-called height of 6.25 nm and a width of 7.5 nm) were provided between the linear metal layers 2 and the linear dielectric layers 3, and the ratio at which the area of the air layers occupied the area of the linear metal layer 2 obtained based height×depth was set to 0.3% (Condition 2). The results of evaluation of the inorganic polarizing plate of Condition 2 are presented in Table 1-1 and Table 1-2.

Next, inorganic polarizing plates presented in Condition 3 to Condition 8 were obtained in the same manner as in Condition 2 except that the thickness of the air layers or the width of the air layers was changed from the inorganic polarizing plate used in Condition 2, and the ratio at which the air layers occupied the linear metal layer 2 was changed as presented in Table 1-1, and polarizing properties of these inorganic polarizing plates were evaluated (Condition 3 to Condition 8).

The results of evaluation of these inorganic polarizing plates denoted as Condition 3 to Condition 8 are presented in Table 1-2.

Figure 6B:
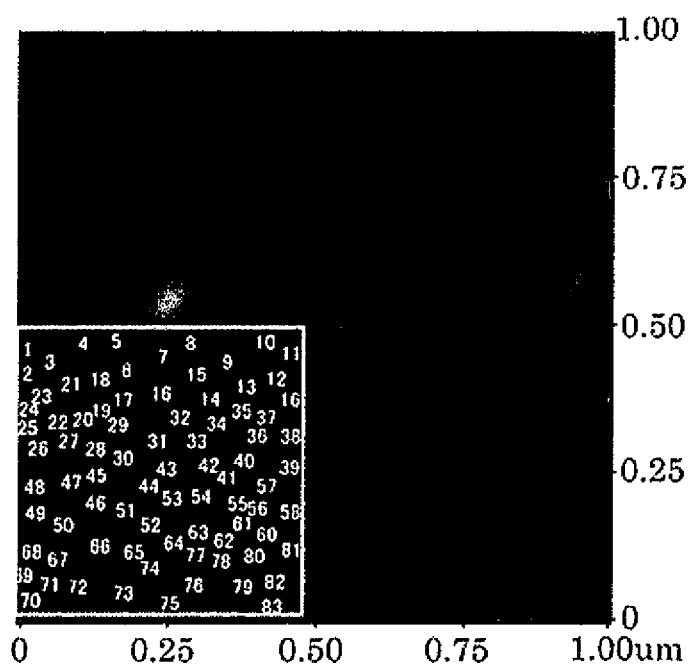
FIG. 6B is an AFM (atomic force microscopic) image used for counting the number of particles in a metal layer in Test Example 2.

In FIG. 6B, AlSi (Si 0.5 atm %) was used as the material. In FIG. 6B, the number of particles in the measurement area having an area of 0.5 micrometers×0.5 micrometers was 83, and the average particle diameter was 54.9 nm.

Figure 6C:
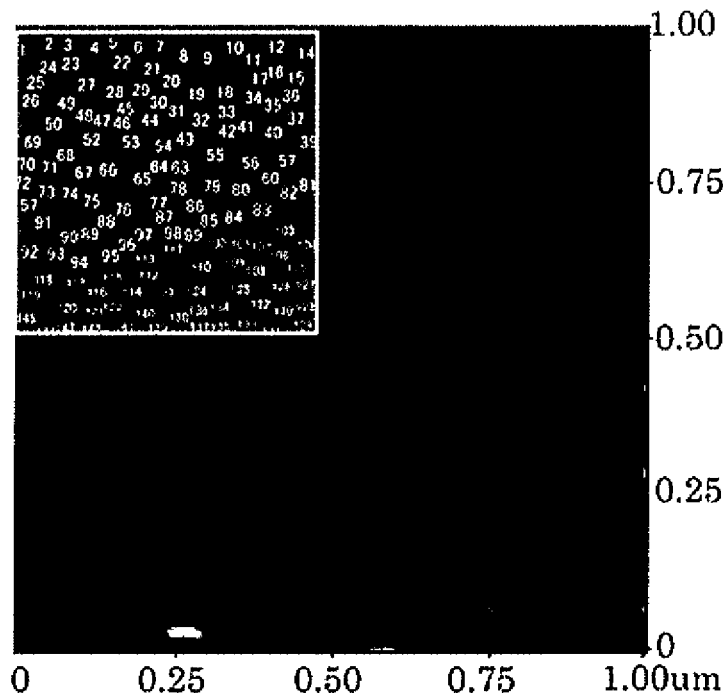
FIG. 6C is an AFM (atomic force microscopic) image used for counting the number of particles in a metal layer in Test Example 2.

In FIG. 6C, AlSi (Si 1.0 atm %) was used as the material. In FIG. 6C, the number of particles in the measurement area having an area of 0.5 micrometers×0.5 micrometers was 145, and the average particle diameter was 41.5 nm.

TABLE 1-1

|  | Thickness of base layer (nm) SiO$_2$ | Thickness of metal layer 2 (nm) Al | Thickness of air layer (nm) Air | Width of air layer (nm) | Ratio at which air layers occupied linear metal layer (%) | Thickness of dielectric layer 3 (nm) SiO$_2$ | Thickness of absorbing layer 4 (nm) FeSi |
|---|---|---|---|---|---|---|---|
| Condition 1 | 35 | 180 | 0 | 0 | 0 | 12.5 | 20 |
| Condition 2 | 35 | 180 | 6.25 | 7.5 | 0.3 | 12.5 | 20 |
| Condition 3 | 35 | 180 | 6.25 | 22.5 | 0.9 | 12.5 | 20 |
| Condition 4 | 35 | 180 | 6.25 | 45 | 1.7 | 12.5 | 20 |
| Condition 5 | 35 | 180 | 12.5 | 45 | 3.5 | 12.5 | 20 |
| Condition 6 | 35 | 180 | 25 | 45 | 6.9 | 12.5 | 20 |
| Condition 7 | 35 | 180 | 50 | 45 | 13.9 | 12.5 | 20 |
| Condition 8 | 35 | 180 | 75 | 45 | 20.8 | 12.5 | 20 |

TABLE 1-2

|  | Optical properties (wavelength of 400-700 nm) | | | | Judgment | | |
|---|---|---|---|---|---|---|---|
|  | Tp | CR | Rp | Rs | Transmission | CR decreasing rate (%) | Reflection |
| Condition 1 | 88.74% | 1,394 | 3.27% | 10.85% | Ref | Ref | Ref |
| Condition 2 | 88.79% | 1,378 | 3.22% | 10.56% | ⊚ | ⊚-1.2 | ⊚ |
| Condition 3 | 88.86% | 1,359 | 3.21% | 10.03% | ⊚ | ⊚-2.5 | ⊚ |
| Condition 4 | 89.04% | 1,325 | 3.18% | 9.20% | ⊚ | ⊚-5.0 | ⊚ |
| Condition 5 | 89.16% | 1,246 | 3.09% | 8.04% | ⊚ | ⊚-10.7 | ⊚ |
| Condition 6 | 89.44% | 1,070 | 2.87% | 6.76% | ⊚ | ○-23.2 | ⊚ |
| Condition 7 | 90.22% | 711 | 2.24% | 6.48% | ⊚ | ○-49.0 | ⊚ |
| Condition 8 | 91.15% | 418 | 1.56% | 7.35% | ⊚ | Δ-70.0 | ⊚ |

In the preset specification, the symbols are as follows.
Tp: transmittance of transmission axis
CR: contrast (transmittance of transmission axis/transmittance of absorption axis)
Rp: reflectance of transmission axis
Rs: reflectance of absorption axis From Table 1-2, it was confirmed that the effect of increasing the transmittance and lowering the reflectance was greater when the air layers were formed. It was also found that there was a tendency that the size of the air layers, such as the formation area and thickness was proportional to the effect of improving the transmittance and the reflectance.

Test Example 2

An experiment for adjusting the particle density of Al-containing particles (average particle diameter of particles) in the metal layer by changing the amount of Si to be added to Al, which was the material of the metal layer, was performed.

The produced metal layer was observed with an AFM (atomic force microscope), and the results illustrated in FIG. 6A to FIG. 6C were obtained.

In FIG. 6A, Al was used as the material. In FIG. 6A, the number of particles in the measurement area having an area of 0.5 micrometers×0.5 micrometers was 44, and the average particle diameter was 75.4 nm.

Next, with the use of the metal layers illustrated in FIG. 6A to FIG. 6C, inorganic polarizing plates were produced by the producing method described above, in order to examine the relationship between the particle density (average particle diameter of particles) in the metal layer and presence or absence of formation of hollow portions. As a result, it was confirmed that hollow portions were formed in the inorganic polarizing plate using the metal layer of FIG. 6A (see FIG. 7A).

Figure 7A:
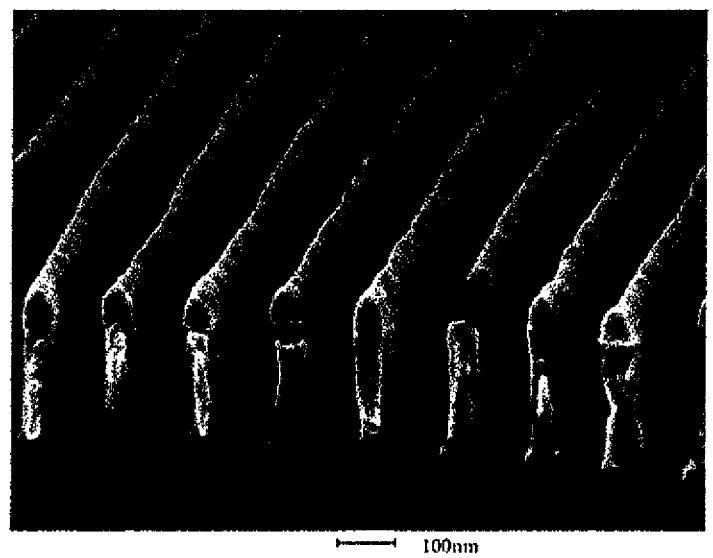
FIG. 7A is a cross-sectional image of an inorganic polarizing plate, which is a sample in Test Example 2.
Figure 7B:
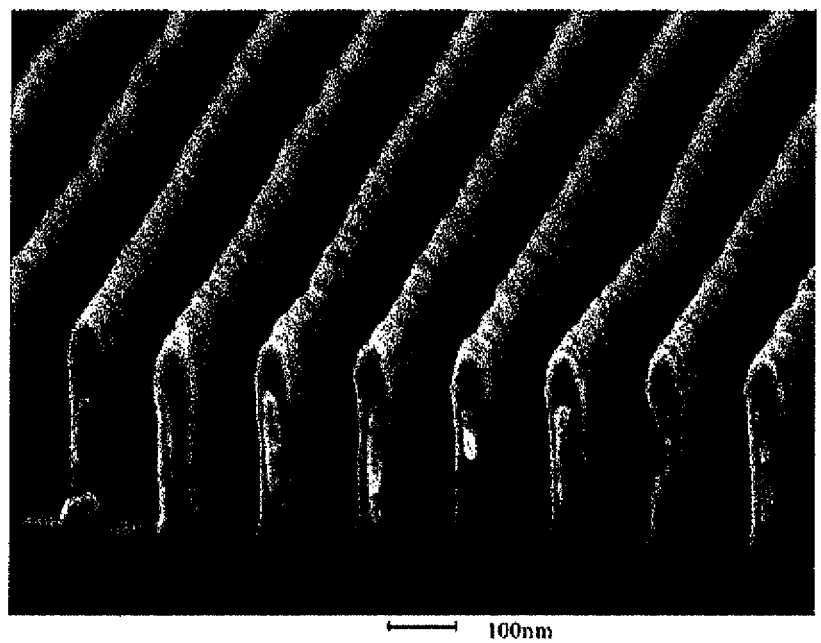
FIG. 7B is a cross-sectional image of an inorganic polarizing plate, which is a sample in Test Example 2.
Figure 7C:
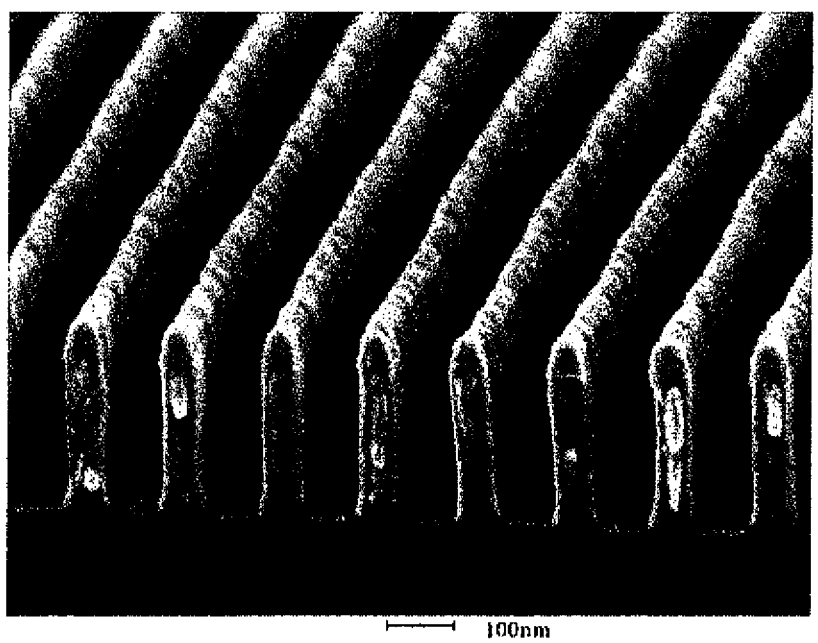
FIG. 7C is a cross-sectional image of an inorganic polarizing plate, which is a sample in Test Example 2.

FIG. 7A to FIG. 7C are scanning electron microscopic (SEM) images of cross-sectional shapes of the inorganic polarizing plates. FIG. 7A illustrates a SEM image of the inorganic polarizing plate using the metal layer of FIG. 6A. FIG. 7B illustrates a SEM image of the inorganic polarizing plate using the metal layer of FIG. 6B. FIG. 7C illustrates a SEM image of the inorganic polarizing plate using the metal layer of FIG. 6C.

In FIG. 7A, hollow portions were formed. In FIG. 7B and FIG. 7C, no hollow portions were formed.

Hence, it was confirmed effective to set the film density of the particles in the metal layer to a rough level and to set the average particle diameter of the particles to 60 nm or greater in order to form hollow portions in the metal layer.

Test Example 3

A sample having hollow portions in linear metal layers was produced, and the polarizing property of the sample was evaluated.

Figure 8A:
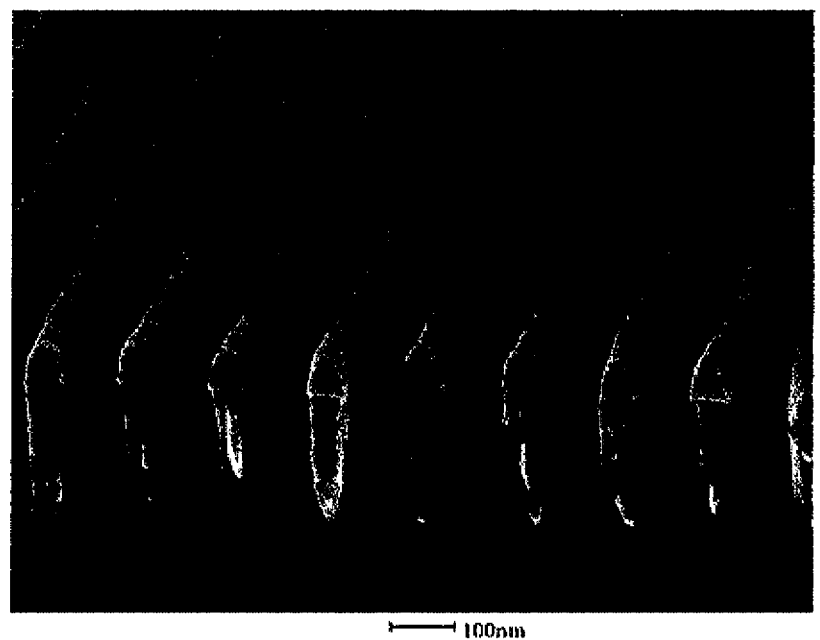
FIG. 8A is a cross-sectional image of an inorganic polarizing plate, which is a sample in Test Example 3.
Figure 8B:
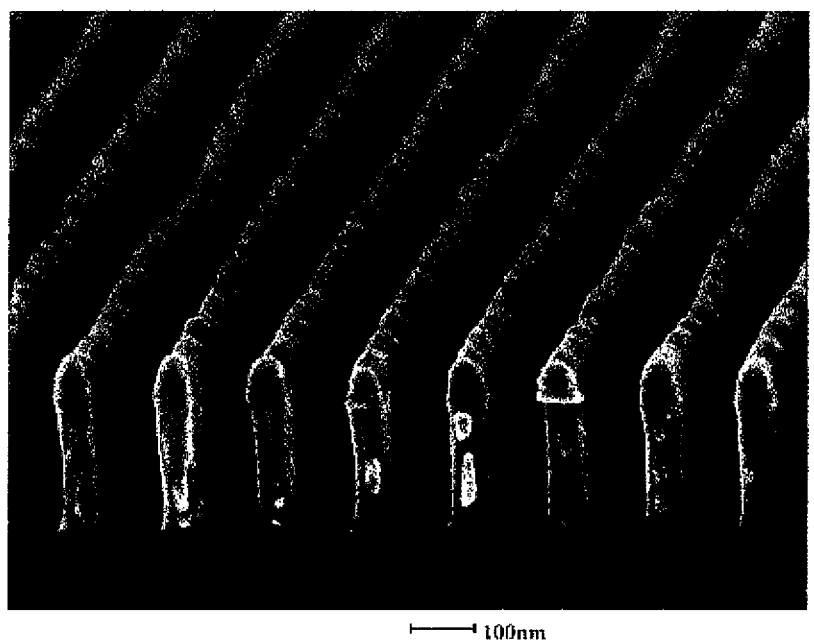
FIG. 8B is a cross-sectional image of an inorganic polarizing plate, which is a sample in Test Example 3.

Specifically, inorganic polarizing plates having the cross-sectional shapes illustrated in FIG. 8A and FIG. 8B (SEM images) were produced, and the polarizing property of the inorganic polarizing plates was evaluated.

From the result of Test Example 2, two kinds of materials, namely Al and AlSi (Si 0.5 atm %), were used as the materials of the metal layer.

The samples had a configuration in which a base layer ($SiO_2$: 35 nm), linear metal layers (Al or AlSi (0.5%): 220 nm), linear dielectric layers ($SiO_2$: 10 nm), and linear light absorbing layers (FeSi (Fe 5 atm %): 25 nm) were formed on a substrate (glass) in this order. The interval (pitch) in the lattice was 141 nm. With the use of a $Cl_2/BCl_3/N_2$ etching gas, inorganic polarizing plates were produced by the producing method described above, with appropriate adjustment of, for example, the etching conditions.

Hollow portions were formed in FIG. 8A in which Al was used as the material of the metal layer, whereas no hollow portions were formed in FIG. 8B in which AlSi (Si 0.5 atm %) was used as the material of the metal layer.

The ratio at which air layers occupied the linear metal layer in the inorganic polarizing plate of FIG. 8A was calculated. As a result, it was 3.0%. As illustrated in FIG. 9, the number of hollow portions present in 6 linear metal layers was 17. The total of the areas of the 17 hollow portions in the area of the 6 linear metal layers each having a height of 220 nm and a depth of 635 nm was calculated as 25,741 $nm^2$ as presented in Table 2 below. Hence, the ratio at which the air layers occupied the linear metal layer in FIG. 9 was 3.0%.

Note that the areas of the hollow portions presented in Table 2 were obtained by converting the hollow portions into approximate semicircular shapes based on the height and width of the hollow portions with respect to an in-plane surface defined by the height and depth of the linear metal layers and roughly estimating the areas of the approximate semicircular shapes.

TABLE 2

| Hollow portion No. | Area $nm^2$ |
| --- | --- |
| 1 | 2,149 |
| 2 | 1,804 |
| 3 | 1,489 |
| 4 | 634 |
| 5 | 2,149 |
| 6 | 2,327 |
| 7 | 726 |
| 8 | 732 |
| 9 | 1,078 |
| 10 | 1,205 |
| 11 | 1,348 |
| 12 | 1,967 |
| 13 | 2,525 |
| 14 | 372 |
| 15 | 377 |
| 16 | 4,052 |
| 17 | 537 |

The polarizing properties of the polarizing plates illustrated in FIG. 8A and FIG. 8B were evaluated. In the evaluation of the polarizing properties, transmittance was evaluated with U-4100 available from Hitachi High-Technologies Corporation, and reflectance was evaluated with V-570 available from JASCO Corporation. Light was made incident from the linear light absorbing layers side. The results are presented in Table 3.

TABLE 3

| Sample | | | Optical property (wavelength: 400-700 nm) | | | |
| --- | --- | --- | --- | --- | --- | --- |
| | | | Tp | CR | Rp | Rs |
| With hollow portions | Metal layer: Al | FIG. 8A | 92.0% | 816 | 0.9% | 9.9% |
| Without hollow portions | Metal layer: AlSi (0.5%) | FIG. 8B | 91.6% | 1,172 | 1.6% | 15.0% |

From Table 3, it was confirmed that with hollow portions formed, the effect of the air layers led to increasing the transmittance and lowering the reflectance, as in the simulation results.

INDUSTRIAL APPLICABILITY

The inorganic polarizing plate of the present invention can be used suitably for liquid crystal display devices because the inorganic polarizing plate has an excellent polarizing property.

REFERENCE SIGNS LIST

1 substrate
2 linear metal layers
2' metal layer
3 linear dielectric layers
3' dielectric layer
4 linear light absorbing layers
4' light absorbing layer
5 base layer
6 first mask layer
6' patterned first mask layer
7 second mask layer
7' patterned second mask layer
8 reflection preventing layer
9 patterned resist film
11 hollow portion

The invention claimed is:
1. An inorganic polarizing plate, comprising in an order of reciting:
   a substrate that is transparent to light in a range used;
   a plurality of linear metal layers;
   a plurality of linear dielectric layers; and
   a plurality of linear light absorbing layers having a light absorbing effect,
   wherein the plurality of linear metal layers are arranged on the substrate in a state of being apart from each other at intervals shorter than a wavelength of the light,
   wherein the plurality of linear dielectric layers are arranged on the plurality of linear metal layers respectively,
   wherein the plurality of linear light absorbing layers are arranged on the plurality of linear dielectric layers respectively, and
   wherein the linear metal layers have hollow portions, and the hollow portions are present dispersedly in the linear metal layers.

2. The inorganic polarizing plate according to claim 1, wherein an average particle diameter of particles in the linear metal layers is 60 nm or greater.

3. The inorganic polarizing plate according to claim 1, wherein an average thickness of the linear metal layers is from 20 nm through 400 nm.

4. The inorganic polarizing plate according to claim 1, wherein a material of the linear metal layers is any one of aluminum and an aluminum alloy.

5. The inorganic polarizing plate according to claim 1, wherein a material of the linear dielectric layers is $SiO_2$.

6. The inorganic polarizing plate according to claim 1, wherein a material of the linear light absorbing layers is any one of Si and silicide.

7. The inorganic polarizing plate according to claim 6, wherein the silicide is silicide that comprises Fe in an amount of 10 atm % or less.

8. The inorganic polarizing plate according to claim 6, wherein the silicide is silicide that comprises Ta in an amount of 40 atm % or less.

9. The inorganic polarizing plate according to claim 1, wherein a material of the substrate is any one of glass, crystal, and sapphire.

10. The inorganic polarizing plate according to claim 1, wherein at least one transparent film having a refractive index lower than a refractive index of the substrate is laminated at an interface between the substrate and the linear metal layers.

11. A method for producing the inorganic polarizing plate according to claim 1, the method comprising:
etching a metal layer formed on a substrate using an etching gas that comprises $Cl_2$.

12. The method for producing the inorganic polarizing plate according to claim 11, wherein the etching gas comprises $N_2$ and $BCl_3$.

13. The inorganic polarizing plate according to claim 1, wherein the hollow portions are formed in the linear metal layers near an interface with the dielectric layers.

* * * * *